United States Patent
Silver

(10) Patent No.: US 10,096,952 B1
(45) Date of Patent: Oct. 9, 2018

(54) CABLE HAVING AN INTEGRATED ANTENNA

(71) Applicant: CSC Holdings, LLC, Bethpage, NY (US)

(72) Inventor: Kenneth Silver, Woodbury, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 15/659,202

(22) Filed: Jul. 25, 2017

Related U.S. Application Data

(63) Continuation of application No. 14/960,878, filed on Dec. 7, 2015, now Pat. No. 9,774,147.

(60) Provisional application No. 62/241,424, filed on Oct. 14, 2015.

(51) Int. Cl.
| | |
|---|---|
| *H01R 13/66* | (2006.01) |
| *H04W 72/04* | (2009.01) |
| *H01Q 1/22* | (2006.01) |
| *H01B 7/02* | (2006.01) |
| *H01B 9/02* | (2006.01) |
| *H01B 9/00* | (2006.01) |

(52) U.S. Cl.
CPC ........... *H01R 13/6691* (2013.01); *H01B 7/02* (2013.01); *H01B 9/003* (2013.01); *H01B 9/02* (2013.01); *H01Q 1/22* (2013.01); *H04W 72/048* (2013.01)

(58) Field of Classification Search
CPC ... H01R 13/6691; H04W 72/048; H01B 9/02; H01B 7/02
USPC .......................................................... 439/38
See application file for complete search history.

(56) References Cited

U.S. PATENT DOCUMENTS

| | | | | |
|---|---|---|---|---|
| 4,180,819 A | * | 12/1979 | Nakano | H01Q 9/18 343/792 |
| 4,330,783 A | * | 5/1982 | Toia | H01Q 9/16 343/749 |
| 4,584,587 A | * | 4/1986 | Ireland | H01Q 9/145 343/745 |
| 5,963,168 A | * | 10/1999 | Brennan | H01Q 21/10 343/700 MS |
| 6,177,911 B1 | * | 1/2001 | Yuda | H01Q 1/246 343/790 |
| 6,281,856 B1 | * | 8/2001 | Tang | H01Q 9/30 343/790 |
| 6,486,746 B1 | * | 11/2002 | Gilbert | H04L 25/0298 333/124 |

(Continued)

OTHER PUBLICATIONS

U.S. Appl. No. 14/960,878, filed Dec. 7, 2015, entitled "Cable Having an Integrated Antenna".

*Primary Examiner* — Alexander Gilman
(74) *Attorney, Agent, or Firm* — Sterne, Kessler, Goldstein & Fox P.L.L.C.

(57) ABSTRACT

A cable assembly including a first connector, a second connector, and a cable is disclosed that routes power, and/or information between devices. The cable includes a first group of one or more conductors that are mechanically connected to the first connector and the second connector to route power and/or one or more wired information communications between the devices. The cable also includes a second group of one or more that is mechanically connected to the first connector to provide one or more wireless information communications between the first device and the second device or a third device which is not mechanically connected to the cable assembly.

20 Claims, 7 Drawing Sheets

(56) References Cited

U.S. PATENT DOCUMENTS

| | | | | |
|---|---|---|---|---|
| 6,842,155 B1* | 1/2005 | Yeh | H01Q 9/42 | 343/790 |
| 6,980,162 B1* | 12/2005 | Laaksonen | G06F 1/1616 | 343/702 |
| 7,136,026 B2* | 11/2006 | Lee | H01Q 1/24 | 343/791 |
| 7,433,302 B2* | 10/2008 | Allen | H04L 12/40182 | 370/216 |
| 7,645,167 B2* | 1/2010 | Mellage | H01Q 1/242 | 439/638 |
| 7,765,358 B2* | 7/2010 | Rutherford | G06F 13/4022 | 439/166 |
| 8,013,799 B2* | 9/2011 | Chung | H01Q 9/30 | 343/791 |
| 8,075,348 B2* | 12/2011 | Mei | H01R 31/005 | 439/676 |
| 8,515,230 B2* | 8/2013 | Lapp | H01B 7/368 | 385/101 |
| 8,542,472 B2* | 9/2013 | Mullins | H01R 24/60 | 361/86 |
| 8,554,033 B2* | 10/2013 | Kewitsch | G02B 6/3895 | 340/505 |
| 8,581,792 B2* | 11/2013 | Mukai | H01Q 1/46 | 343/702 |
| 8,704,722 B2* | 4/2014 | Tsung-Wen | H01Q 9/30 | 343/791 |
| 8,854,275 B2* | 10/2014 | Doneker | H01Q 1/526 | 343/700 MS |
| 8,888,500 B2* | 11/2014 | Gao | H01R 13/17 | 439/39 |
| 8,957,822 B2* | 2/2015 | Mendenhall | H01Q 1/1242 | 343/791 |
| 9,093,795 B2* | 7/2015 | Ashibu | H01R 12/7011 | |
| 9,130,265 B1* | 9/2015 | Hill | H01Q 7/08 | |
| 9,130,274 B1* | 9/2015 | Vincent | H01Q 9/32 | |
| 9,196,956 B2* | 11/2015 | King | H01Q 1/50 | |
| 9,196,979 B2* | 11/2015 | Kim | H01R 13/24 | |
| 9,225,154 B2* | 12/2015 | Borer | H02G 3/081 | |
| 9,306,304 B2* | 4/2016 | Chen | H01R 13/62994 | |
| 9,385,471 B2* | 7/2016 | Zhu | H01R 13/6205 | |
| 9,711,893 B2* | 7/2017 | Rohrbach | H01R 13/6205 | |
| 2005/0212713 A1* | 9/2005 | Dai | H01Q 9/28 | 343/792 |
| 2007/0072443 A1* | 3/2007 | Rohrbach | H01R 13/6205 | 439/39 |
| 2009/0267613 A1* | 10/2009 | Terlizzi | G06F 13/385 | 324/538 |
| 2010/0089187 A1* | 4/2010 | Yin | G01R 1/06722 | 73/866.5 |
| 2012/0177324 A1* | 7/2012 | Schwandt | G02B 6/4292 | 385/57 |
| 2012/0200173 A1* | 8/2012 | Liu | G06F 1/1613 | 307/116 |
| 2013/0093638 A1* | 4/2013 | Shoemaker | H01Q 1/007 | 343/770 |
| 2014/0162468 A1* | 6/2014 | Kim | H01R 13/6205 | 439/39 |
| 2014/0176264 A1* | 6/2014 | Tago | H05K 1/0225 | 333/238 |
| 2014/0184469 A1* | 7/2014 | Yoshino | H01Q 1/46 | 343/906 |

* cited by examiner

US 10,096,952 B1

CABLE HAVING AN INTEGRATED ANTENNA

CROSS-REFERENCE TO RELATED APPLICATIONS

The present application is a continuation of U.S. patent application Ser. No. 14/960,878, filed Dec. 7, 2015, now U.S. Pat. No. 9,774,147, which claims the benefit of U.S. Provisional Patent Appl. No. 62/241,424, filed Oct. 14, 2015, each of which is incorporated herein by reference in its entirety.

BACKGROUND OF THE DISCLOSURE

Devices have evolved from single-purpose devices into multi-purpose devices of today. For example, a set-top box (STB) or set-top unit (STU) traditionally only provided television service. This single-purpose STB has evolved into a multi-purpose STB enabling access to multiple delivery methods, such as terrestrial, cable, internet, and satellite to provide some examples. This multi-purpose STB combines the traditional television service with other services, such as video on demand, time-shifting, Internet applications, video telephony, surveillance, gaming, shopping, electronic program guides, and e-government to provide examples. The multi-purpose STB can include an antenna for accessing the multiple delivery methods, such as terrestrial, cable, internet, and satellite to provide some examples. The antenna may be mounted internally within the multi-purpose STB or externally to the multi-purpose STB. The performance of the internal antenna is often compromised due to space constraints and attenuation caused by a mechanical enclosure of the multi-purpose STB. In some situations, the external antenna can be used to alleviate these problems. The external antenna is often attached to the mechanical enclosure of the multi-purpose STB and often protrudes from the mechanical enclosure. Not only is the protruding external antenna unsightly, the external antenna is easily broken and can become entangled with cables, such as audio, video, and/or power cables to provide some examples, that are necessary for operation of the multi-purpose STB.

As another example, a mobile phone or cellular phone traditionally only provided telephone service. This single-purpose mobile phone has evolved into a multi-purpose mobile phone or smartphone combining features of the single-purpose mobile phone with those of other popular mobile devices, such as a personal digital assistant (PDA), a multimedia player and a Global Positioning System (GPS) navigation device. Most smartphones access the Internet; have a touchscreen user interface; and run numerous third-party applications. The multi-purpose mobile phone communicates using a wide variety of technologies, such as near field communication (NFC) technologies, Bluetooth technologies, GPS technologies, cellular technologies, and/or wireless local area network (WLAN) technologies to provide some examples. Each of these technologies requires its own antenna within the multi-purpose mobile phone. As the multi-purpose mobile phone continues to evolve into even smaller sizes, the amount of space available for antennas of these technologies as well as other new further technologies not yet discovered continues to decrease.

Figure 1:
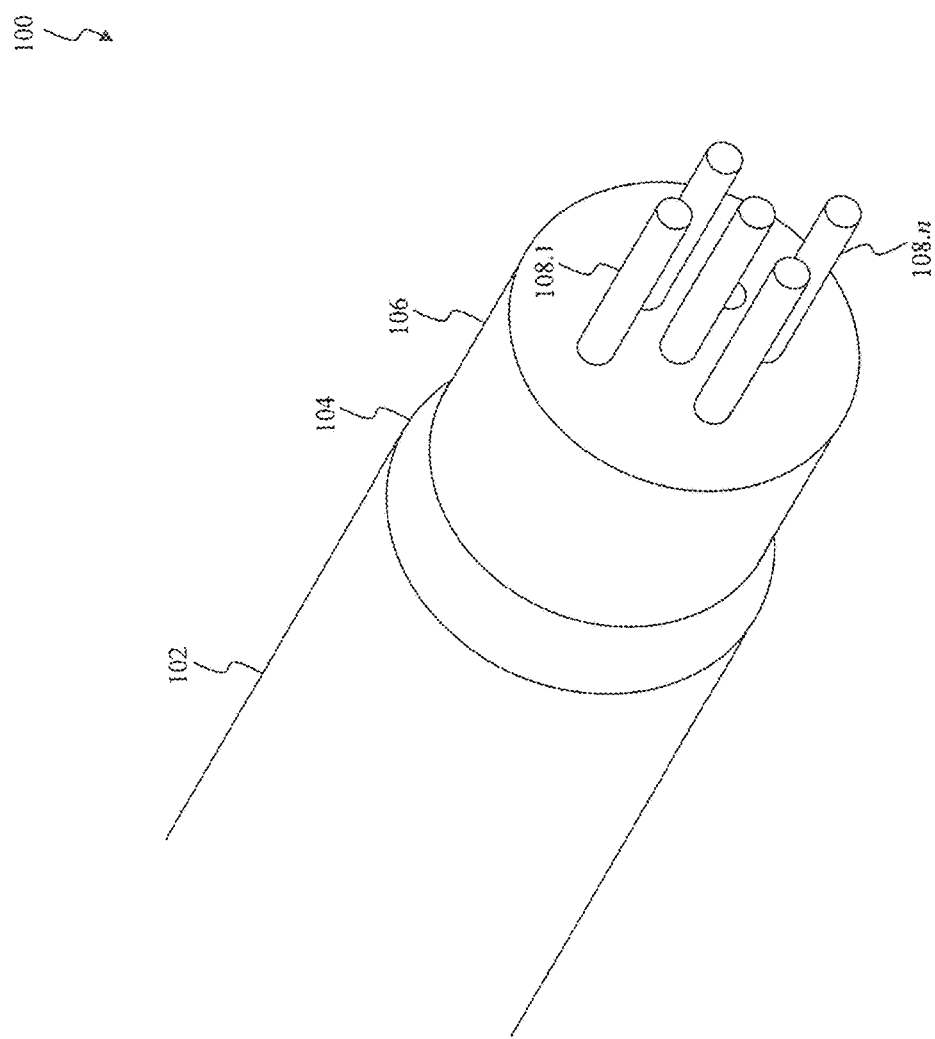
FIG. 1 illustrates a cross sectional view of a cable according to an exemplary embodiment of the present disclosure.

Embodiments of the disclosure are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE DISCLOSURE

Overview

A cable assembly including a first connector, a second connector, and a cable is disclosed that routes power, and/or information between devices. The cable includes a first group of one or more conductors that are mechanically connected to the first connector and the second connector to route power and/or one or more wired information communications between the devices. The cable also includes a second group of one or more conductors that are mechanically connected to the first connector to provide one or more wireless information communications between the first device and the second device or a third device which is not mechanically connected to the cable assembly.

Exemplary Cable

FIG. 1 illustrates a cross sectional view of a cable according to an exemplary embodiment of the present disclosure. A cable 100 routes power, such as alternating current (AC) power or direct current (DC) power to provide some examples, one or more information communications, such as one or more wired communications and/or one or more wireless communications to provide some examples, between devices. Generally, the one or more information communications represent any communication that uses a modulated or unmodulated signal to convey information, such as data and/or one or more commands to provide some examples, that are routed between the devices. The one or more information communications can include communications that are prescribed in one or more wireless networking communication standards or protocols, such as a version of an Institute of Electrical and Electronics Engineers (IEEE) 802.11 communication standard, for example, 802.11a, 802.11b/g/n, and/or 802.11ac which are collectively referred to as Wi-Fi, an IEEE 802.16 communication standard, also referred to as Worldwide Interoperability for Microwave Access (WiMAX), a version of a Bluetooth communication standard, a version of a ZigBee communication standard, a version of a Z-Wave communication standard, a version of a IPv6 over Low power Wireless Personal Area Networks (6LoWPAN) communication standard, a version of Insteon, an ISO/IEC 14543-3-10 communication standard, also referred to as EnOcean, and/or or any other wireless networking communication standard or protocol that will be apparent to those skilled in the relevant art(s) without departing from the spirit and scope of the present disclosure. The one or more information communications can also, or alternatively, include communications that are prescribed in one or more cellular communication standards, such as a third Generation Partnership Project (3GPP) Long Term Evolution (LTE) communication standard, a fourth generation (4G) mobile communication standard, or a third generation (3G) mobile communication standard to provide some examples.

The devices can include one or more mobile phones; one or more mobile computing devices; one or more mobile internet devices; one or more personal digital assistants; one or more handheld game consoles; one or more portable media players; one or more digital cameras; one or more personal navigation devices; one or more tablet computers; one or more personal computers; one or more peripheral devices, such as one or more external drives, one or more printers, one or more mice, one or more keyboards, one or more displays, such as one or more television sets or monitors; one or more scanners; one or more power providing connectors, such as one or more AC connectors; and/or any other suitable device that will be apparent to those skilled in the relevant art(s). The cable 100 includes a cable jacket 102, a shielding and reinforcement assembly 104, an insulating assembly 106, and conductors 108.1 through 108.n. Although the cable 100 is illustrated as including the cable jacket 102, the shielding and reinforcement assembly 104, and the insulating assembly 106 in FIG. 1, this is for illustrative purpose only. Those skilled in the relevant art(s) will recognize that the cable 100 can include different combinations of the cable jacket 102, the shielding and reinforcement assembly 104, and the insulating assembly 106 without departing from the spirit and scope of the present disclosure. For example, in an exemplary embodiment, the cable 100 includes the cable jacket 102, the insulating assembly 106, and the conductors 108.1 through 108.n.

The cable jacket 102 represents a protective outer coating for the cable 100. Generally, the cable jacket 102 protects the conductors 108.1 through 108.n from mechanical, moisture, light, and/or chemical damage during installation and/or service life of the cable 100. In some situations, the cable jacket 102 can enhance flame resistance of the cable 100, improve sunlight and electrical surface tracking resistance of the cable 100, facilitate installation of the cable 100, and/or provide a manner to identify and/or group the cable 100. The cable jacket 102 can be constructed using one or more plastic materials, such as Polyvinyl Chloride (PVC), Polyethylene (PE), Polypropylene (PP), Polyurethane (PUR), or Nylon to provide some examples, one or more rubber materials, such as Thermoplastic Rubber (TPR), Neoprene (Polychloroprene), Styrene Butadiene Rubber (SBR), Silicone, Fiberglass, Ethylene Propylene Rubber (EPR), Chlorosulfonated Polyethylene (CSPE), Ethylene Propylene Diene Monomer (EPDM) to provide some examples, one or more fluoropolymers, such as Polytetrafluoroethylene (PTFE), Fluorinated Ethylene Propylene (FEP), ETFE Tefzel and ECTFE Halar, Polyvinylidene Fluoride (PVDF), or Thermoplastic Elastomers (TPE) to provide some examples, and/or any other suitable material that will be apparent to those skilled in the relevant art(s).

The shielding and reinforcement assembly 104 protects the cable 100 from electromagnetic interference (EMI) and/or light intrusion as well as can provide mechanical reinforcement for the cable 100. The cable 100 can be a source of EMI for other devices. For example, electromagnetic signals flowing through the conductors 108.1 through 108.n can generate a magnetic field and/or an electric field which can disrupt or impede operation of other devices within the magnetic field and/or the electric field. The shielding and reinforcement assembly 104 can protect the other devices from these magnetic fields and/or electric fields. As another example, these other devices can generate electromagnetic fields and/or electromagnetic signals which can couple onto the conductors 108.1 through 108.n. The shielding and reinforcement assembly 104 can protect the devices coupled to the cable 100 from these electromagnetic fields and/or electromagnetic signals. Typically, the shielding and reinforcement assembly 104 is formed using one or more conductive materials, such as aluminum (Al), Copper (Cu), Silver (Ag), Gold (Au), Tin (Sn), or Nickel (Ni) to provide some examples, combinations of the one or more conductive materials, or by a mesh or braid of the one or more conductive materials. As to be discussed below, a first group of conductors from among the conductors 108.1 through 108.n can be configured as one or more integrated antennas to provide for the one or more wireless communications between the devices. In an exemplary embodiment, the shielding and reinforcement assembly 104 can include one or more openings or holes to allow electromagnetic waves to pass between the one or more integrated antennas and the devices. In this exemplary embodiment, a diameter the one or more openings or holes are greater than or equal to a wavelength ($\lambda$) of the electromagnetic waves to allow them to pass through the shielding and reinforcement assembly 104.

The insulating assembly 106 represents an assembly of non-conductive material or semi-conductive material that encapsulates the conductors 108.1 through 108.n to prevent the conductors 108.1 through 108.n from physically contacting each other. Although the insulating assembly 106 is typically not effective in preventing the propagation of electromagnetic waves between the cable 100 and the devices, the insulating assembly 106 represents a dielectric load for the cable 100 which increases the effectiveness of the shielding and reinforcement assembly 104 in protecting the cable 100 from EMI. The insulating assembly 106 can be constructed using one or more plastic materials, such as Polyvinyl Chloride (PVC), Polyethylene (PE), Polypropylene (PP), Polyurethane (PUR), or Nylon to provide some examples, one or more rubber materials, such as Thermoplastic Rubber (TPR), Neoprene (Polychloroprene), Styrene Butadiene Rubber (SBR), Silicone, Fiberglass, Ethylene Propylene Rubber (EPR), Chlorosulfonated Polyethylene (CSPE), Ethylene Propylene Diene Monomer (EPDM) to provide some examples, one or more fluoropolymers, such as Polytetrafluoroethylene (PTFE), Fluorinated Ethylene Propylene (FEP), ETFE Tefzel and ECTFE Halar, Polyvinylidene Fluoride (PVDF), or Thermoplastic Elastomers (TPE) to provide some examples, and/or any other suitable material that will be apparent to those skilled in the relevant art(s). In an exemplary embodiment, the insulating assembly 106 can represent a region of free space between the cable jacket 102 and/or the shielding and reinforcement assembly 104 and the conductors 108.1 through 108.n. In this exemplary embodiment, the one or more of the conductors 108.1 through 108.n can each include their own insulating assembly which is similar to the insulating assembly 106.

The conductors 108.1 through 108.n route the power, and/or the one or more information communications between the devices. As illustrated in FIG. 1, the conductors 108.1 through 108.n are formed using a single, solid strand, referred to as a solid conductor, of one or more conductive materials, such as aluminum (Al), Copper (Cu), Silver (Ag), Gold (Au), Tin (Sn), and/or Nickel (Ni) to provide some examples, and/or of one or more transparent materials, such as clear glass or polymer lightguides to provide some examples. However, it is possible that the conductors 108.1 through 108.n can be implemented using multiple strands of the one or more conductive materials and/or the one or more transparent materials. In an exemplary embodiment, the one or more conductive materials carry electrical signals between the devices. In another exemplary embodiment, one or more of the conductors 108.1 through 108.n can be formed using one or more non-conductive materials, such as silica, fluoride glass, phosphate glass, chalcogenide glass to provide some examples, to carry optical signals between the devices.

A first group of one or more conductors from among the conductors 108.1 through 108.n is configured to route the power and/or the one or more wired communications between the devices. The power routed through the first group of one or more conductors can include alternating current (AC) power and/or direct current (DC). Additionally, the first group of one or more conductors can route any suitable analog and/or digital signal that will be apparent to those skilled in the relevant art(s) without departing from the spirit and scope of the present disclosure between the devices as the one or more wired communications. In some situations, groups of the first group of one or more conductors can be twisted together to form twisted conductors, such as one or more twisted pairs to provide an example.

A second group of one or more conductors from among the conductors 108.1 through 108.n is configured to form one or more transmission lines to form one or more integrated antennas for one or more wireless communications. The second group of one or more conductors can be configured form a monopole antenna, such as a quarter-wave monopole to provide an example. However, those skilled in the relevant art(s) will recognize that the second group of one or more conductors can be configured to form other antennas, such as a dipole antenna, an antenna array, a loop antenna, or a traveling wave antenna to provide some examples, without departing from the spirit and scope of the present disclosure. In some situations, second group of one or more conductors can be configured to form more than one integrated antenna within the cable 100. For example, the devices can be operable to communication in accordance with the one or more wireless networking communication standards or protocols, each of the one or more wireless networking communication standards or protocol can define different operating parameters for its respective communication signals. In this example, the second group of one or more conductors can include multiple integrated antennas, each integrated antenna from among the multiple integrated antennas corresponding to a wireless communication standard or protocol from among the one or more wireless networking communication standards or protocols.

Although the cable 100 is illustrated in FIG. 1 as being circular, this is for illustrative purposes only. Those skilled in the relevant art(s) will recognize that the cable jacket 102, the shielding and reinforcement assembly 104, the insulating assembly 106, and the conductors 108.1 through 108.n can be of any suitable configuration and arrangement without departing from the spirit and scope of the present disclosure. For example, the cable jacket 102, the shielding and reinforcement assembly 104, the insulating assembly 106, and the conductors 108.1 through 108.n can be of suitable configuration and arrangement to form a flexible flat cable.

Exemplary Connectors for the Cable

Figure 2A:
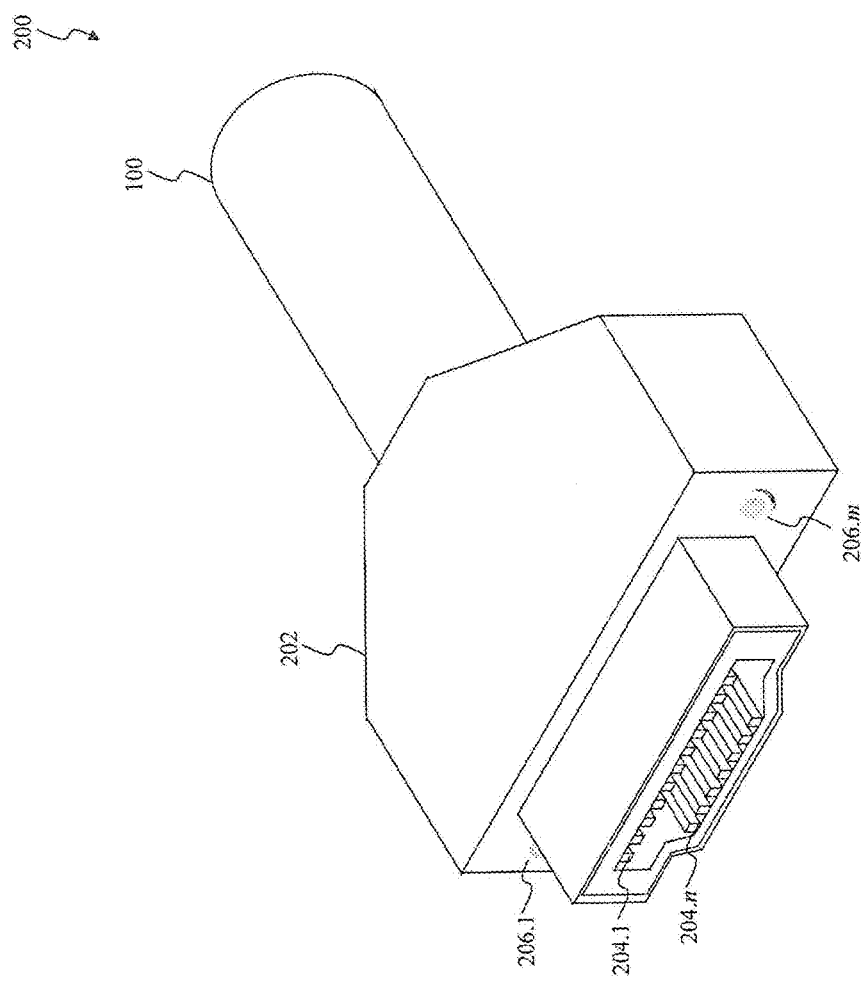
FIG. 2A illustrates an exemplary male connector for the cable according to an exemplary embodiment of the present disclosure.

FIG. 2A illustrates an exemplary male connector for the cable according to an exemplary embodiment of the present disclosure. Typically, a first end of the cable 100 is mechanically connected to a first connector for coupling the cable 100 to a first device and a second end of the cable 100 is mechanically connected to a second connector for coupling the cable 100 to a second device. A male connector 200 can represent an exemplary embodiment of the first connector and/or the second connector. The male connector 200 can be referred to as a plug. The male connector 200 includes a male mechanical housing 202, mechanical contacting pins 204.1 through 204.n, and magnetic contacting pins 206.1 through 206.m.

The male mechanical housing 202 represents a protective outer coating for the male connector 200. Generally, the male mechanical housing 202 protects the mechanical contacting pins 204.1 through 204.n, and/or magnetic contacting pins 206.1 through 206.m from mechanical, moisture, light, and/or chemical damage during installation and/or service life of the male connector 200. The configuration of the male mechanical housing 202 typically depends on the number of the conductors 108.1 through 108.n within the cable 100. Preferably, a standard mechanical housing, such as a D-type related mechanical housing, a registered jack (RJ) related mechanical housing, a Universal Serial Bus (USB) related mechanical housing, a High-Definition Multimedia Interface (HDMI) related mechanical housing, a Digital Visual Interface (DVI) related mechanical housing, an S-Video related mechanical housing, a Video Graphics Array (VGA) related mechanical housing, a DisplayPort related mechanical housing, a Deutsches Institut für Normung (DIN)/Mini-DIN related mechanical housing, a Syndicat des Constructeurs d'Appareils Radiorecepteurs et Téléviseurs—Radio and Television Receiver Manufacturers Association (SCART) related mechanical housing, a D-Terminal related mechanical housing, a Unified Display Interface (UDI) related mechanical housing, HDBaseT related mechanical housing, or any other standardized mechanical housing can be used for the male mechanical housing 202. The male mechanical housing 202 exposes the mechanical contacting pins 204.1 through 204.n in such a way to allow the male connector 200 to be inserted into a female connector, such as a jack, an outlet, or a receptacle to provide some examples, to ensure a reliable mechanical and electrical connection between the male connector 200 and the first device and/or the second device.

The mechanical contacting pins 204.1 through 204.n mechanically connect the male connector 200 to mechanical contacting pins of a corresponding plug of a device. For example, a first group of the mechanical contacting pins 204.1 through 204.n can be mechanically connected, for example, soldered or crimped, onto the first group of one or more conductors of the cable 100 to mechanically connect the first group of one or more conductors of the cable 100 and the male connector 200. Often times, a second group of the mechanical contacting pins 204.1 through 204.n are designated as being "reserved" or "future use" by one or more wired communication standards or protocols. The one or more wired communication standards or protocols can include a version of an IEEE 802.11 communication standard, an IEEE 1394 "FireWire" communication standard, an HDMI communication standard, Digital Visual Interface (DVI) communication standard, an S-Video communication standard, a Video Graphics Array (VGA) communication standard, a DisplayPort communication standard, a serial digital interface (SDI) communication standard, an HDBaseT communication standard, or a Mobile High-Definition Link (MHL) standard to provide some examples. In these situations, the second group of the mechanical contacting pins 204.1 through 204.n that are designated as being "reserved" or "future use" can mechanically connect to the second group of one or more conductors of the cable 100 to mechanically connect the second group of one or more conductors of the cable 100 and the male connector 200. Alternatively, or in addition to, conventional mounting hardware, such as one or more mechanical screws to provide an example, which secure the male connector 200 to the first device or the second device can be substituted with the magnetic contacting pins 206.1 through 206.m. The magnetic contacting pins 206.1 through 206.m can be formed using magnetic material such as iron, nickel, cobalt, some alloys of rare earth metals, and some naturally occurring minerals such as lodestone to provide some examples. The second group of one or more conductors of the cable 100 can be mechanically connected to the magnetic contacting pins 206.1 through 206.m to couple the second group of one or more conductors of the cable 100 to the male connector 200. The magnetic contacting pins 206.1 through 206.m magnetically couple to corresponding magnetic contacting pins of the first device or the second device to electrically couple the second group of one or more conductors of the cable 100 to the first device or the second device as well as to mechanically connect the male connector 200 to the first device or the second device. Optionally, other common techniques such as adhesives and/or screw or pin connectors can be used to enhance the magnetic contacting pins 206.1 through 206.m to the corresponding magnetic contacting pins of the first device or the second device.

Figure 2B:
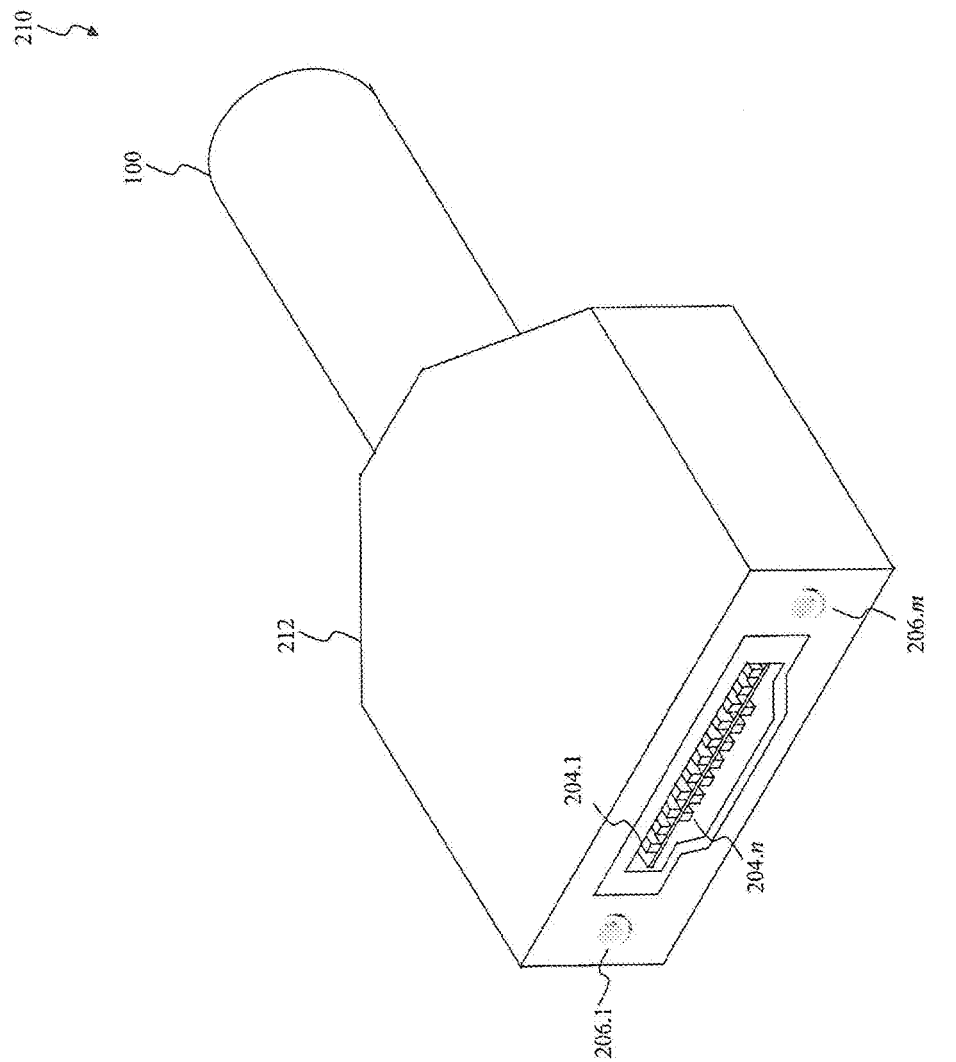
FIG. 2B illustrates an exemplary female connector for the cable according to an exemplary embodiment of the present disclosure.

FIG. 2B illustrates an exemplary female connector for the cable according to an exemplary embodiment of the present disclosure. Typically, a first end of the cable 100 is mechanically connected to a first connector for coupling the cable 100 to a first device and a second end of the cable 100 is mechanically connected to a second connector for coupling the cable 100 to a second device. A female connector 210 can represent an exemplary embodiment of the first connector and/or the second connector. The female connector 210 can be referred to as a jack, outlet, or receptacle. The female connector 210 includes the mechanical contacting pins 204.1 through 204.n, the magnetic contacting pins 206.1 through 206.m, and a female mechanical housing 212. The female connector 210 shares similar features as the male connector 200; therefore, only differences between the female connector 210 and the male connector 200 are discussed in further detail below.

The female mechanical housing 212 represents a protective outer coating for the female connector 210. The female mechanical housing 212 includes one or more recessed holes with the mechanical contacting pins 204.1 through 204.n inside in such a way to allow the male connector 200 to be inserted into a male connector, such as a plug to provide an example, to ensure a reliable mechanical and electrical connection between the female connector 210 and the first device and/or the second device.

Exemplary Cable Assembly

Figure 3:
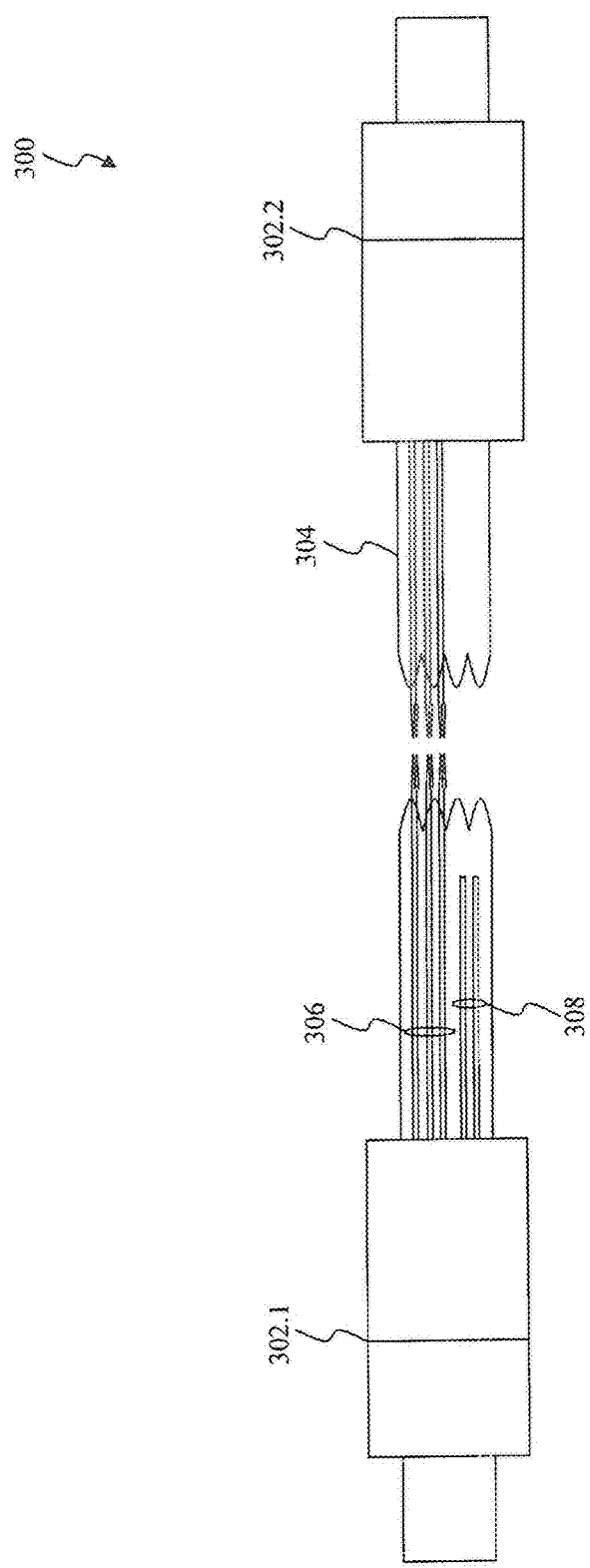
FIG. 3 illustrates an exemplary cable assembly according to an exemplary embodiment of the present disclosure.

FIG. 3 illustrates an exemplary cable assembly according to an exemplary embodiment of the present disclosure. A cable assembly 300 electrically and/or optically couples a first device and a second device. As illustrated in FIG. 3, the cable assembly 300 includes a first connector 302.1 which can be mechanically connected to a corresponding first plug of the first device to electrically couple the cable assembly 300 to the first device and a second connector 302.2 which can be mechanically connected to a corresponding second plug of the second device to electrically couple the cable assembly 300 to the second device. The first connector 302.1 and/or the second connector 302.2 can represent exemplary embodiments of the male connector 200 and/or the female connector 210. Although the cable assembly 300 is illustrated as having the first connector 302.1 and the second connector 302.2, those skilled in the relevant art(s) will recognize that the cable assembly 300 can include a first plug and a second plug or any combination of connectors or plugs without departing from the spirit and scope of the present disclosure.

As additionally illustrated in FIG. 3, a cable 304 mechanically connects and electrically and/or optically couples the first connector 302.1 and the second connector 302.2. The cable 304 can represent an exemplary embodiment of the cable 100. The cable 304 includes a first group of conductors 306, such as the first group of one or more conductors of the cable 100 to provide an example, and a second group of conductors 308, such as the second group of one or more conductors of the cable 100 to provide an example. The first group of conductors 306 is mechanically connected to a first group of mechanical contacting pins, such as a first group of the mechanical contacting pins 204.1 through 204.n to provide an example, of the first connector 302.1 and to a second group of mechanical contacting pins, such as a second group of the mechanical contacting pins 204.1 through 204.n to provide an example, of the second connector 302.2. As such, the first group of conductors 306 routes power, and/or the one or more information communications between the first device and the second device. A first end of the second group of conductors is mechanically connected to the first group of mechanical contacting pins and/or one or more magnetic contacting pins, such as the magnetic contacting pins 206.1 through 206.m to provide an example, of the first connector 302.1 and a second end of the second group of conductors 308 is not terminated, namely not mechanically connected to the second connector 302.2. Rather, the second group of conductors 308 is configured to form one or more transmission lines to form one or more integrated antennas to provide one or more wireless communications between the first device and the second device or one or more third devices which are not mechanically connected to the cable assembly 300.

Although not illustrated in FIG. 3, another second group of conductors 308 can be mechanically coupled to the second connector 302. A first end of the other second group of conductors 308 is mechanically connected to the first group of mechanical contacting pins and/or one or more magnetic contacting pins, such as the magnetic contacting pins 206.1 through 206.m to provide an example, of the second connector 302.2 and a second end of the other second group of conductors 308 is not terminated, namely not mechanically connected to the first connector 302.1. Rather, the other second group of conductors 308 is configured to form one or more second transmission lines to form one or more second integrated antennas to provide one or more wireless communications between the second device and the first device or the one or more third devices.

Exemplary Operating Environments

The following Detailed Description illustrates some exemplary operating environments that can incorporate the cable assembly 300. The cable assembly 300 is not limited to these exemplary operating environments. Rather, those skilled in the relevant art(s) will recognize that the cable assembly 300 can be implemented in other operating environments without departing from the spirit and scope of the present disclosure.

Figure 4:
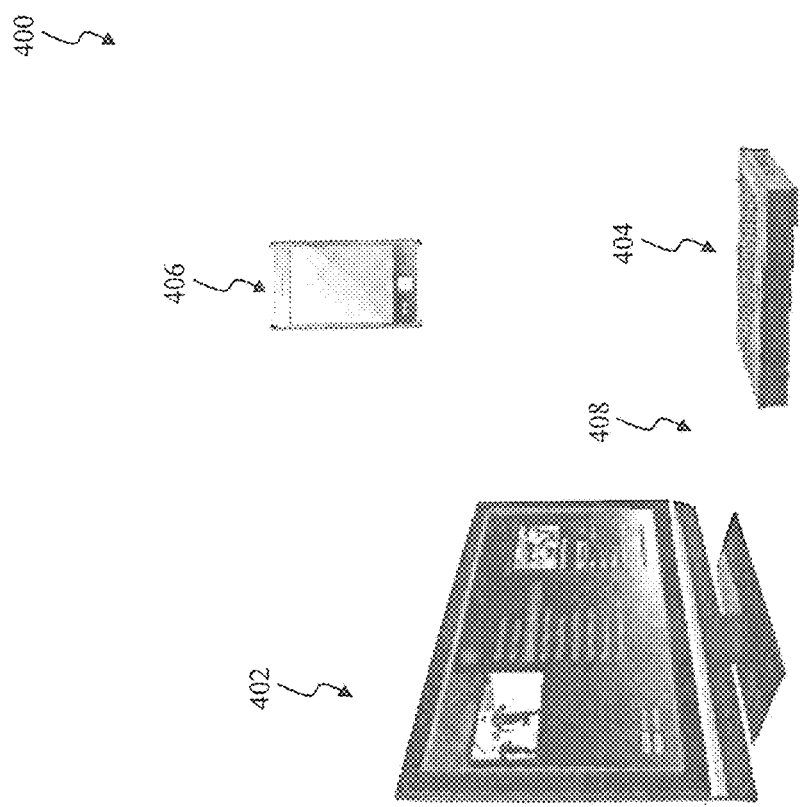
FIG. 4 illustrates a first exemplary operating environment for the cable assembly according to an exemplary embodiment of the present disclosure.

FIG. 4 illustrates a first exemplary operating environment for the cable assembly according to an exemplary embodiment of the present disclosure. As illustrated in FIG. 4, an exemplary operating environment 400 includes a television set 402, a set top box (STB) 404, and a mobile communication device 406. A first end of a cable assembly 408 is mechanically connected to the television set 402 and a second end of the cable assembly 408 is mechanically connected to the STB 404. The cable assembly 408 can represent an exemplary embodiment of the cable assembly 300. The cable assembly 408 includes a first group of conductors and a second group of conductors, such as the first group of conductors 306 and the second group of conductors 308, respectively, to provide an example. The first group of conductors electrically and/or optically couples the television set 402 and the STB 404 to route audio and/or video information relating to a television program from the STB 404 to the television set 402. The second group of conductors can be mechanically coupled to the television set 402 to provide one or more wireless communications between the television set 402 and the mobile communication device 406 or mechanically coupled to the STB 404 to provide one or more wireless communications between the STB 404 and the mobile communication device 406.

Figure 5:
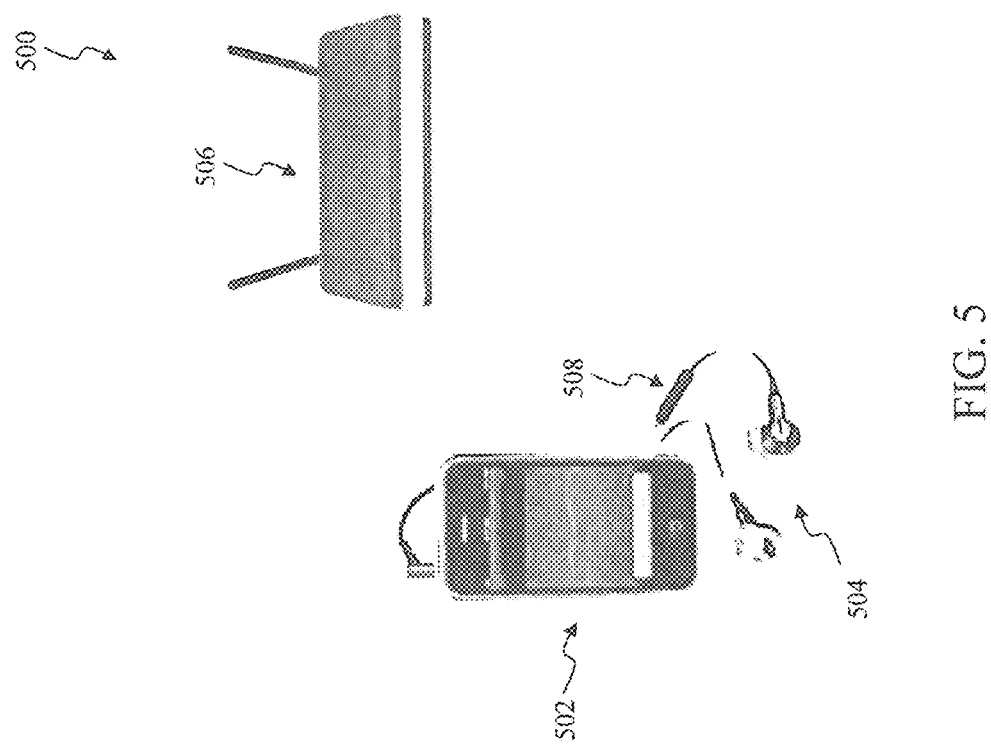
FIG. 5 illustrates a second exemplary operating environment for the cable assembly according to an exemplary embodiment of the present disclosure.

FIG. 5 illustrates a second exemplary operating environment for the cable assembly according to an exemplary embodiment of the present disclosure. As illustrated in FIG. 5, an exemplary operating environment 500 includes a mobile communication device 502, an ear bud 504, and a wireless router 506. A first end of a cable assembly 508 is mechanically connected to the mobile communication device 502 and a second end of the cable assembly 508 is mechanically connected to the ear bud 504. The cable assembly 508 can represent an exemplary embodiment of the cable assembly 300. The cable assembly 508 includes a first group of conductors and a second group of conductors, such as the first group of conductors 306 and the second group of conductors 308, respectively, to provide an example. The first group of conductors electrically and/or optically couples the mobile communication device 502 and the ear bud 504 to route audio information from the mobile communication device 502 to the ear bud 504. The second group of conductors can be mechanically coupled to the mobile communication device 502 to provide one or more wireless communications between the mobile communication device 502 and the wireless router 506.

Figure 6:
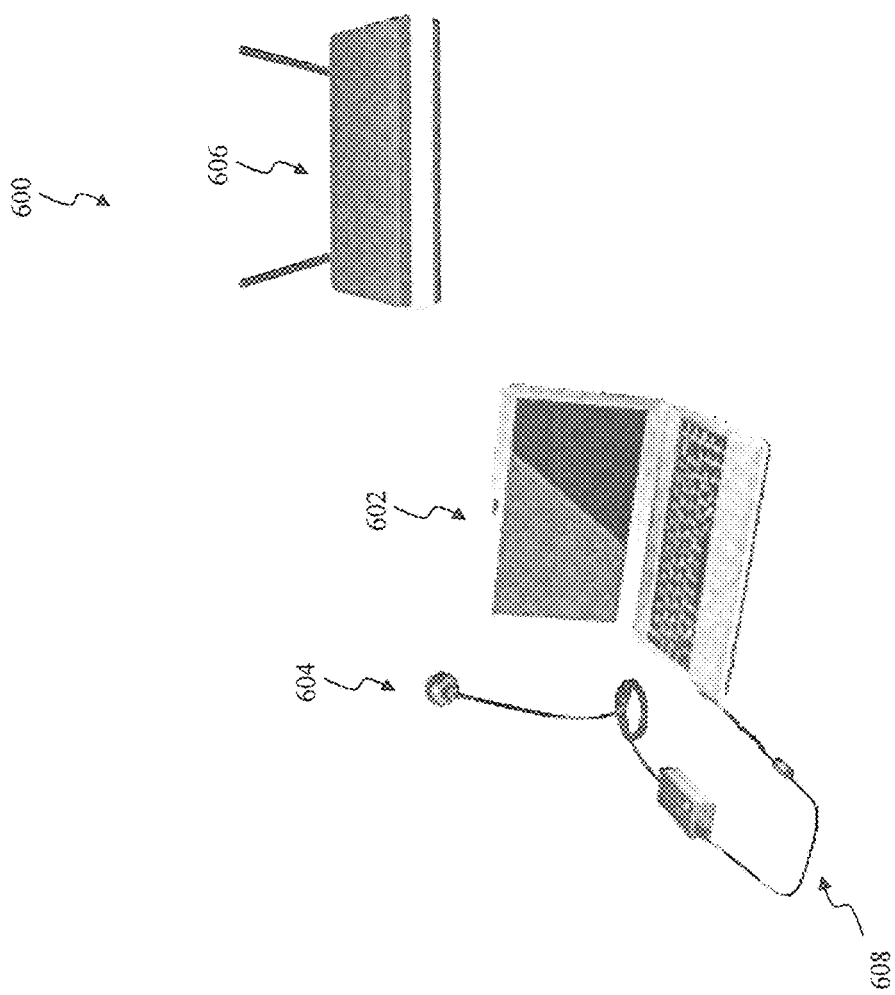
FIG. 6 illustrates a third exemplary operating environment for the cable assembly according to an exemplary embodiment of the present disclosure.

FIG. 6 illustrates a third exemplary operating environment for the cable assembly according to an exemplary embodiment of the present disclosure. As illustrated in FIG. 6, an exemplary operating environment 600 includes a personal computing device 602, an alternating current (AC) connector 604, and a wireless router 606. A first end of a cable assembly 608 is mechanically connected to the personal computing device 602 and a second end of the cable assembly 608 is mechanically connected to the AC connector 604. The cable assembly 608 can represent an exemplary embodiment of the cable assembly 300. The cable assembly 608 includes a first group of conductors and a second group of conductors, such as the first group of conductors 306 and the second group of conductors 308, respectively, to provide an example. The first group of conductors electrically and/or optically couples the personal computing device 602 and the AC connector 604 to route AC power from the AC connector 604 to the personal computing device 602. The second group of conductors can be mechanically coupled to the personal computing device 602 to provide one or more wireless communications between the personal computing device 602 and the wireless router 606.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:
1. A connector, comprising:
a mechanical housing configured to form an outer coating for the connector;
a plurality of mechanical contacting pins, within the mechanical housing, configured to mechanically and electrically connect a plurality of first conductors of a cable to a second connector of a first device; and
a plurality of magnetic contacting pins, within the mechanical housing, configured to magnetically couple to corresponding magnetic contacting pins of the second connector to electrically and mechanically connect a plurality of second conductors of the cable to the second connector, wherein the plurality of magnetic contacting pins is further configured to route a wireless information communication between the plurality of second conductors and the first device.

2. The connector of claim 1, wherein the plurality of mechanical contacting pins and the plurality of magnetic contacting pins are soldered or crimped to the plurality of first conductors and the plurality of second conductors, respectively.

3. The connector of claim 1, wherein the second connector comprises:
a female connector, and
wherein the mechanical housing comprises:
a male mechanical housing configured to be inserted into the female connector to electrically and magnetically connect the plurality of magnetic contacting pins and the corresponding magnetic contacting pins of the second connector.

4. The connector of claim 1, wherein the second connector comprises:
a male connector, and
wherein the mechanical housing comprises:
a female mechanical housing, and
wherein the male connector is configured to be inserted into the female mechanical housing to electrically and magnetically connect the plurality of magnetic contacting pins and the corresponding magnetic contacting pins of the second connector.

5. The connector of claim 1, wherein the plurality of second conductors is configured to route the wireless information communication between the first device and a second device not mechanically coupled to the cable.

6. The connector of claim 1, wherein the plurality of magnetic contacting pins comprise:
a magnetic material.

7. A cable assembly, comprising:
a cable jacket configured to form an outer coating for the cable assembly;
a connector having a mechanical contacting pin and a magnetic contacting pin;
a cable, within the cable jacket, having a first conductor from among a plurality of conductors and a second conductor from among the plurality of conductors,
wherein the first conductor is configured to be mechanically and electrically connected to the mechanical contacting pin,
wherein the second conductor is configured to be mechanically and electrically connected to the magnetic contacting pin,
wherein the magnetic contacting pin is configured to magnetically couple to a corresponding magnetic contacting pin of a first device to mechanically and electrically connect the second conductor and the corresponding magnetic contacting pin, and
wherein a first end of the second conductor and a second end of the second conductor are arranged within the cable jacket to form an integrated antenna, the first end of the second conductor being electrically and mechanically connected to the magnetic contacting pin, the second end of the second conductor not being mechanically connected within the cable jacket.

8. The cable assembly of claim 7, wherein the second conductor is configured to route a wireless information communication between the magnetic contacting pin and a second device not mechanically coupled to the cable assembly.

9. The cable assembly of claim 7, wherein the first conductor is configured to route a wired information communication or power between the mechanical contacting pin and the first device.

10. The cable assembly of claim 7, wherein the connector comprises:
a male connector configured to be inserted into a female connector of the first device to electrically and magnetically connect the magnetic contacting pin and the corresponding magnetic contacting pin.

11. The cable assembly of claim 7, wherein the connector comprises:
a female connector, and
wherein a male connector of the first device is configured to be inserted into the female connector to electrically and magnetically connect the magnetic contacting pin and the corresponding magnetic contacting pin.

12. The cable assembly of claim 7, further comprising:
a shielding assembly, formed between the cable jacket and the plurality of conductors, including a plurality of openings, the plurality of openings being configured to pass an electromagnetic wave between the cable jacket and the integrated antenna.

13. A connector, comprising:
a mechanical contacting pin configured to mechanically and electrically connect a first conductor from among a plurality of conductors of a cable to a first device; and
a magnetic contacting pin configured to magnetically couple to a corresponding magnetic contacting pin of the first device to electrically and mechanically connect a second conductor from among the plurality of conductors to the first device,
wherein the magnetic contacting pin is further configured to route a wireless information communication between the second conductor and the first device.

14. The connector of claim 13, wherein the mechanical contacting pin and the magnetic contacting pin are soldered or crimped to the first conductor and the second conductor, respectively.

15. The connector of claim 13, wherein the second conductor is configured to route the wireless information communication between the first device and a second device not mechanically coupled to the cable.

16. The connector of claim 13, wherein the magnetic contacting pin comprises:
a magnetic material.

17. The connector of claim 13, wherein a first end of the second conductor and a second end of the second conductor are arranged within the cable to form an integrated antenna, the first end of the second conductor being electrically and mechanically connected to the magnetic contacting pin, the second end of the second conductor not being mechanically connected within the cable.

18. The connector of claim 13, wherein the connector is a male connector configured to be inserted into a female connector of the first device to electrically and magnetically connect the connector to the first device.

19. The connector of claim 13, wherein the connector is a female connector, and
wherein a male connector of the first device is configured to be inserted into the female connector to electrically and magnetically connect the connector to the first device.

20. The connector of claim 13, wherein the mechanical contacting pin is further configured to route a wired information communication or power between the first conductor and the first device.

* * * * *